United States Patent
Ray et al.

(10) Patent No.: US 7,669,466 B2
(45) Date of Patent: Mar. 2, 2010

(54) MONITORING DEVICE ATTACHMENT TO RUBBER VALVE STEMS

(75) Inventors: Curtis A. Ray, Alamo, CA (US); Michael Malaga, San Francisco, CA (US)

(73) Assignee: LV Sensors, Inc., Emeryville, CA (US)

( * ) Notice: Subject to any disclaimer, the term of this patent is extended or adjusted under 35 U.S.C. 154(b) by 228 days.

(21) Appl. No.: 12/004,001

(22) Filed: Dec. 18, 2007

(65) Prior Publication Data

US 2008/0276995 A1 Nov. 13, 2008

Related U.S. Application Data

(60) Provisional application No. 60/928,609, filed on May 9, 2007.

(51) Int. Cl.
*B60C 23/02* (2006.01)
(52) U.S. Cl. .................... 73/146.8; 152/427
(58) Field of Classification Search ............. 73/146.8; 152/427
See application file for complete search history.

(56) References Cited

U.S. PATENT DOCUMENTS

| | | | |
|---|---|---|---|
| 2,968,333 A | 1/1961 | Ayres | |
| 4,310,014 A | 1/1982 | Parker | |
| 4,411,302 A * | 10/1983 | Kuypers | 152/427 |
| 4,581,925 A | 4/1986 | Crutcher | |
| 4,763,517 A | 8/1988 | Feinberg | |
| 5,027,848 A | 7/1991 | Leeuwen | |
| 5,681,061 A | 10/1997 | Olson | |
| 5,837,891 A | 11/1998 | Bridge | |
| 5,844,131 A | 12/1998 | Gabelmann et al. | |
| 6,005,480 A * | 12/1999 | Banzhof et al. | 340/447 |
| 6,163,255 A * | 12/2000 | Banzhof et al. | 340/447 |
| 6,722,409 B1 * | 4/2004 | Martin | 152/427 |
| 7,086,412 B2 | 8/2006 | Uleski | |
| 7,469,581 B2 * | 12/2008 | Katou et al. | 73/146.8 |
| 2004/0046649 A1 | 3/2004 | Sanchez et al. | |
| 2004/0084124 A1 * | 5/2004 | Martin | 152/427 |
| 2005/0087007 A1 | 4/2005 | Uleski | |
| 2005/0087229 A1 * | 4/2005 | Uleski | 137/223 |

\* cited by examiner

*Primary Examiner*—Andre J Allen
(74) *Attorney, Agent, or Firm*—Lumen Patent Firm

(57) ABSTRACT

Tire sensor packaging capable of being installed on a standard snap-in tire valve stem is provided. The sensor package includes an attachment member capable of being disposed in the flexible bore of a snap-in tire valve stem, and of securely engaging with the inner wall of the flexible bore. The attachment member can be an integral part of the sensor package, or it can be a separate part that acts as an expansion device (e.g., an expansion nut) when engaged with the sensor package. Preferably, the attachment member includes features, such as barbs, to provide more secure engagement with the tire valve stem. Packages according to embodiments of the invention include a package passage (e.g., a channel or a bore) to permit the flow of air past the sensor, so that the tire can be inflated or deflated. Sensors can be attached to the tire valve stem before or after the tire valve stem is installed in the wheel.

21 Claims, 6 Drawing Sheets

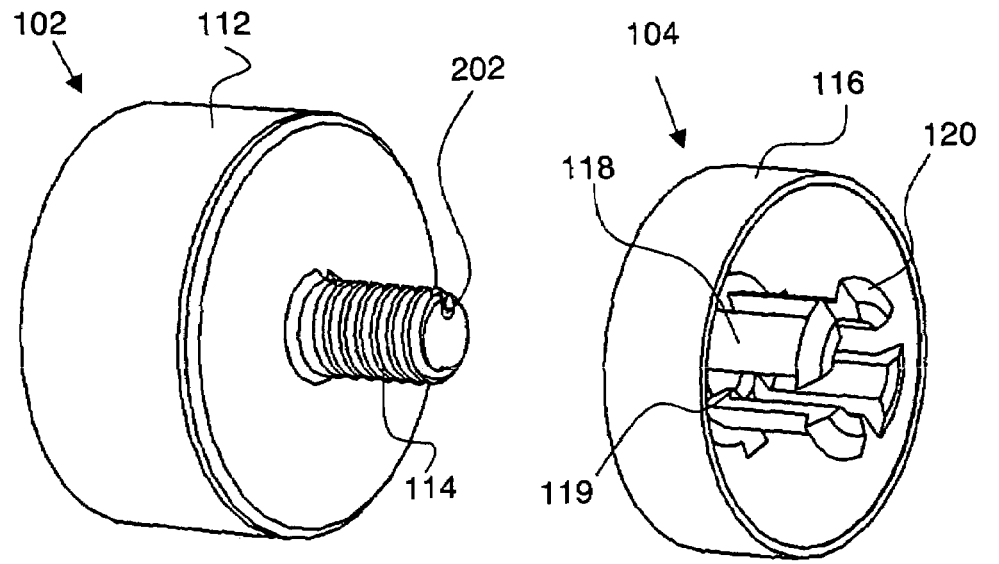
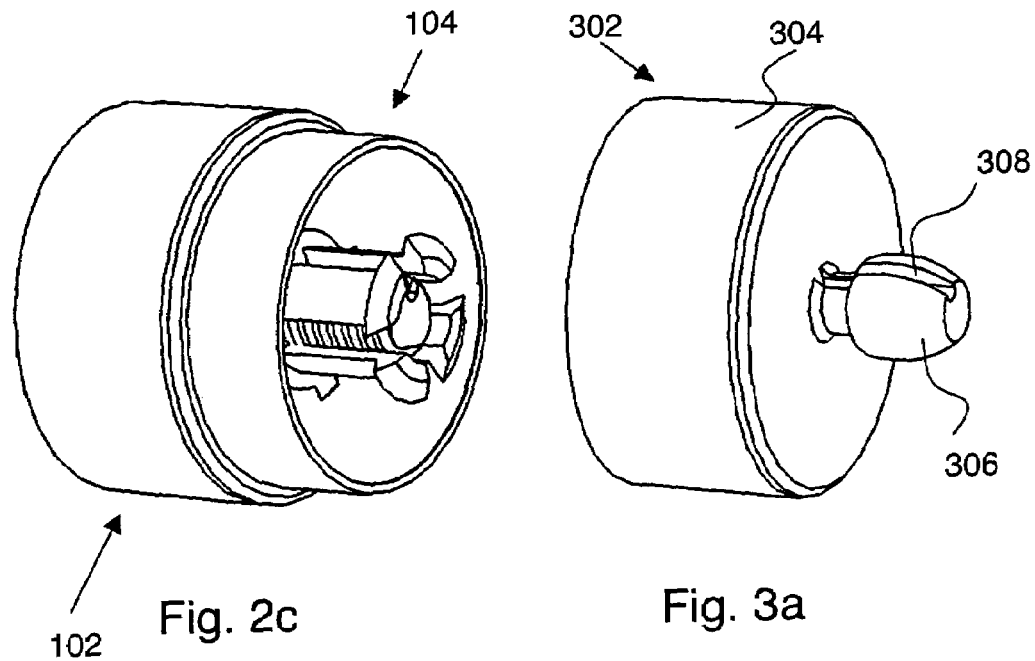
Fig. 2a    Fig. 2b
Fig. 2c    Fig. 3a

US 7,669,466 B2

MONITORING DEVICE ATTACHMENT TO RUBBER VALVE STEMS

CROSS REFERENCE TO RELATED APPLICATIONS

This application claims the benefit of U.S. provisional patent application 60/928,609, filed on May 9, 2007, entitled "Monitoring Device Attachment to Rubber Valve Stems", and hereby incorporated by reference in its entirety.

FIELD OF THE INVENTION

This invention relates to packaging for mounting a sensor to a tire valve stem.

BACKGROUND

Tire pressure sensors for monitoring tire pressure have been under development for some time. Since such sensors are typically disposed on the tire being monitored, various sensor attachment/packaging approaches have been considered. For example, in U.S. Pat. No. 4,763,517, a sensor is mounted in the cap of a tire valve stem. More commonly, sensors have been attached to and/or integrated with modified valve stems of various kinds.

For example, in US 2004/0046649, a sensor is attached to a metal bore of a valve stem, which can serve as an antenna for the sensor. In U.S. Pat. No. 4,310,014, a modified tire valve stem is employed, having a pressure sensor integrated with the valve stem. In U.S. Pat. No. 5,844,131, a sensor is connected to a metal tire valve stem with a hollow screw that engages into the valve bore.

One commonly employed type of tire valve stem is the so-called "snap-in" tire valve stem, which has been in use for many years. For example, a snap-in tire valve stem is described in U.S. Pat. No. 2,968,333, issued in 1961. A snap-in tire valve stem includes a metal tube surrounded by and bonded to a flexible valve stem body, where the flexible valve stem body is configured to snap in to a valve opening of a wheel rim, and the metal tube is configured to accommodate a valve. Part of the bore of a standard snap-in tire valve stem is flexible, in order to provide the above-described snap-in functionality.

Several approaches have been demonstrated for attaching a sensor to a snap-in tire valve stem. For example, in U.S. Pat. No. 6,005,480, the sensor is engaged with the metal tube of the tire valve stem, by threads or a press fit. In U.S. Pat. No. 6,722,409, a snap-in tire valve stem is fabricated having a second metal insert within it, to which a sensor can be attached.

The snap-in concept has also been applied in a somewhat different manner in U.S. Pat. No. 7,086,412 and US 2005/0087007. In this work, a snap-in grommet is employed having an outer flexible body surrounding a metal sleeve. The valve stem and sensor are both attached to the metal sleeve of the grommet.

However, these prior art approaches tend to suffer from the disadvantage that substantial modification of an otherwise standard valve stem is required to permit sensor attachment. For example, the snap-in valve stem of U.S. Pat. No. 6,005,480 must have a metal tube that is threaded or capable of making a press fit connection with a sensor package, thereby making it a non-standard part. Similarly, the snap-in valve stem of U.S. Pat. No. 6,722,409 is made with a second metal insert, again making it a non-standard part.

Accordingly, it would be an advance in the art to provide attachment of a sensor to a standard snap-in tire valve stem.

SUMMARY

Tire sensor packaging capable of being installed on a standard snap-in tire valve stem is provided. The sensor package includes an attachment member capable of being disposed in the flexible bore of a snap-in tire valve stem, and of securely engaging with the inner wall of the flexible bore. The attachment member can be an integral part of the sensor package, or it can be a separate part that acts as an expansion device (e.g., an expansion nut) when engaged with the sensor package. Preferably, the attachment member includes features, such as barbs, to provide more secure engagement with the tire valve stem. Packages according to embodiments of the invention include a package passage (e.g., a channel or a bore) to permit the flow of air past the sensor, so that the tire can be inflated or deflated. Sensors can be attached to the tire valve stem before or after the tire valve stem is installed in the wheel.

BRIEF DESCRIPTION OF THE DRAWINGS

FIGS. 2a-c show several views of a sub-assembly of the example of FIGS. 1a-c.

FIGS. 3a-c show several views of a second embodiment of the invention.

DETAILED DESCRIPTION

Figure 1A:
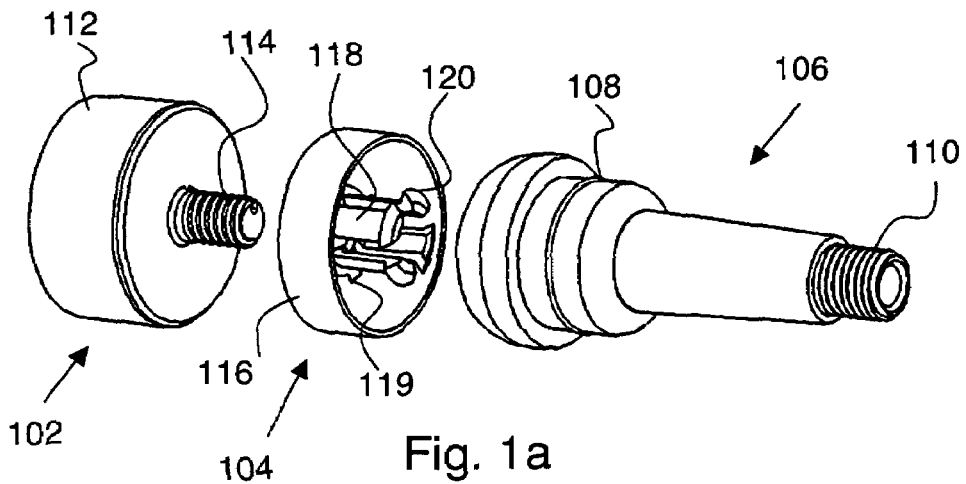
FIGS. 1a-c show several views of a first embodiment of the invention.
Figure 1B:
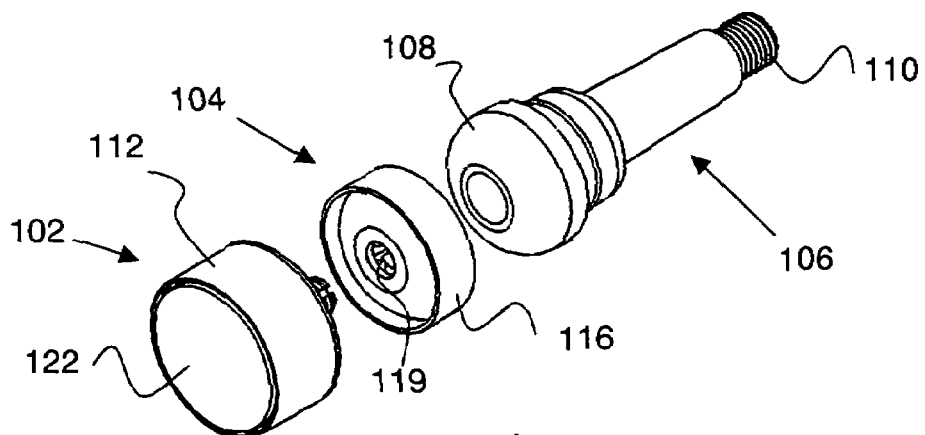
Figure 1C:
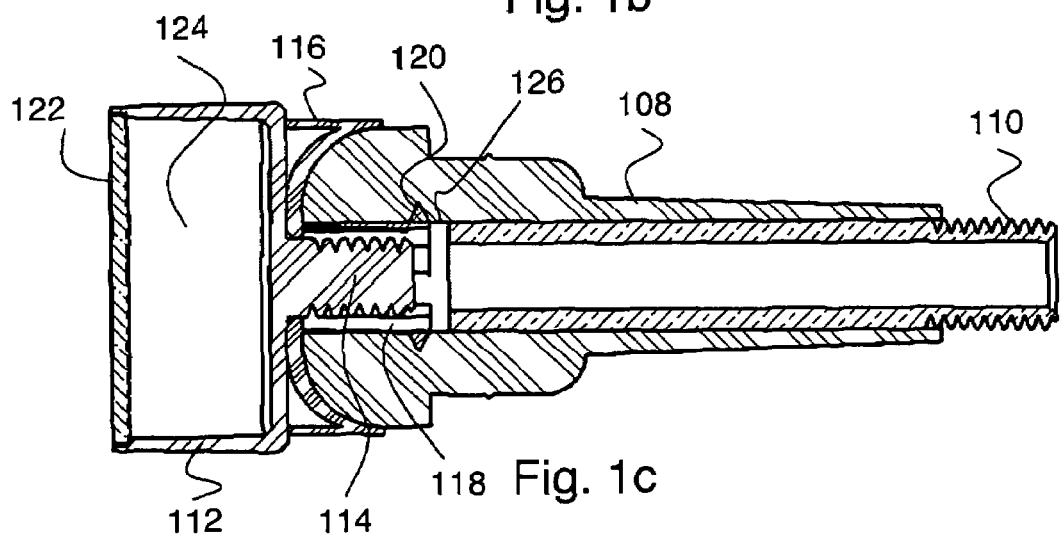

FIGS. 1a-c show several views of a first embodiment of the invention. FIGS. 1a-b show two exploded views, while FIG. 1c shows a cross section view of an assembled configuration. In this example, a package body 102 and an attachment member 104 are configured to be attachable to a snap-in tire valve stem 106. Package body 102 includes a housing 112, a threaded member 114, and a package lid 122. Housing 112 and package lid define an enclosure 124, in which a sensor can be disposed. Practice of the invention does not depend on the type of sensor or its detailed implementation. Preferably, the sensor is a pressure sensor implemented as a miniature battery-powered sensor providing a wireless output.

Attachment member 104 includes a cap 116 and an expansion nut 118, where the expansion nut has barbs 120 and threads 119. Preferably, cap 116 is configured to follow the contour of valve stem 106, as shown on FIG. 1c. Preferably attachment member 104 is made by injection molding of any suitable plastic such as ABS. The barbs 120 can be designed such that no sliders are required for injection molding the part, thereby reducing cost. The barbs 120 on the end of expansion nut slip out of the mold, being compressed while ejected. The threads 119 can be connected to the opposite end of the expansion nut 118 from barbs 120 and can be stiffened by cap 116. The mold half forming the left portion of the attachment member 104 as viewed in FIG. 1a can be rotated to eject attachment member 104.

Preferably valve stem 106 is a standard valve stem having a metal tube 110 surrounded by and bonded to a flexible valve stem body 108. Metal tube 110 does not extend along the entire length of valve stem 106, so part of the bore of valve stem 106 is a flexible bore 126.

Attachment member 104 is configured to securely engage with flexible bore 126. In this example, barbs 120 serve to make the connection more secure. In a typical assembly sequence, attachment member 104 would be positioned such that expansion nut 118 and barbs 120 are disposed in flexible bore 126. After this step, threaded member 114 of package body 102 can be screwed into expansion nut 118 of attachment member 114 by engaging with threads 119, thereby driving barbs 120 into the inner wall of flexible bore 126. Surface roughening of the interface of expansion nut 118 to package body 102, which can readily be implemented, creates a connection less likely to unscrew itself. FIG. 1c shows a cross section view of the resulting assembly.

Secure attachment of the sensor to the valve stem is an important aspect of embodiments of the invention. As a tire rotates, centrifugal forces can approach two thousand Gs at high speeds with low profile tires. The sensor residing in enclosure 124, the attachment member 104 and package body 102 can weigh up to one ounce in total. The force or torque pulling the sensor package out of the tire valve stem can therefore be over one hundred pounds. One of the objectives of the invention is to increase the sealing force of the rubber valve stem to the tire rim. The barbs 120 provide extra force pushing the rubber into the rim and creating a seal more resistant to the forces imparted by the package body 102.

Another important aspect of the invention is attachment of a sensor package to the flexible bore of a standard snap-in tire valve stem. By securely attaching the sensor package to the flexible bore of the tire valve stem, undesirable modification of the tire valve stem is completely avoided, which can substantially reduce cost. Previous approaches for attaching a sensor to a snap-in tire valve stem have typically relied on making metal to metal contact between the sensor package and a metal part of the tire valve stem. In such approaches, the tire valve stem is a non-standard part, which can substantially increase its cost. Maintaining an inventory of specialized valve stems at repair facilities would also be necessary with such an approach. Common practice at repair facilities is to replace the valve stem each time a tire is replaced, so the use of a standard snap-in tire valve stem, as provided by embodiments of the present invention, is advantageous.

FIGS. 2a-c show several views of a sub-assembly of the example of FIGS. 1a-c. In this more detailed view, a package passage 202 is shown on threaded member 114 of package body 102. Package passage 202 is capable of being in communication with flexible bore 126 of tire valve stem 106 and with the interior of a tire, thereby allowing for the passage of air through the package passage and the flexible bore to inflate or deflate the tire. In the example of FIG. 2a, the package passage is a channel formed in a side of the package. Alternatively, the package passage can be a bore through the package, as shown on FIG. 4c. Practice of the invention does not depend critically on details of how air flow from valve stem 106 to the tire interior is provided for.

In the more detailed view of FIG. 2b, thread 119 of expansion nut 118 is shown, which can engage with threaded member 114 of package body 102. Expansion nut 118 can have threads at a single location (as shown), or it can have threads along part or all of its length corresponding to the threads along the length of threaded member 114. FIG. 2c shows a view of package body 102 and attachment member 104 in a mated configuration.

Figure 3B:
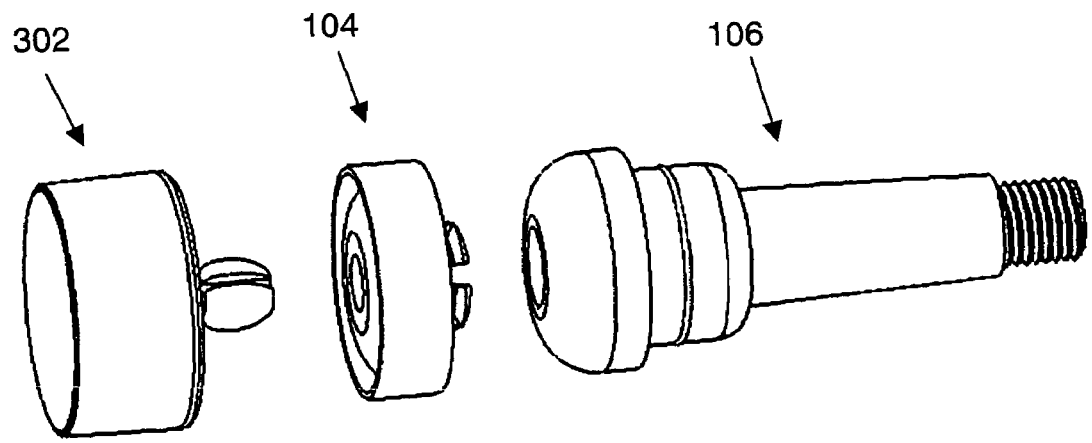
Figure 3C:
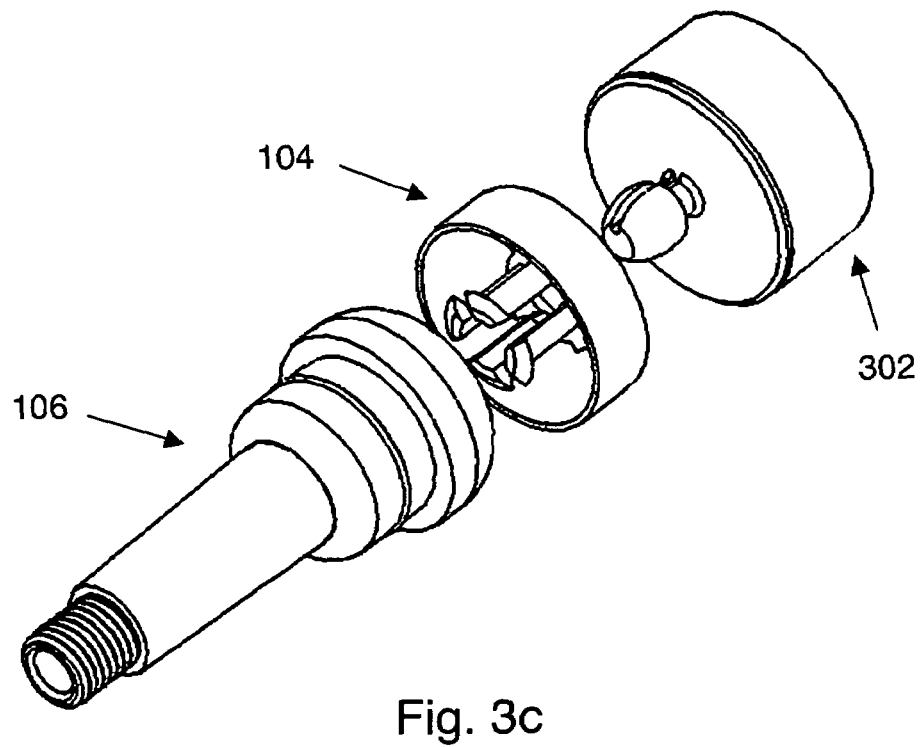

FIGS. 3a-c show several views of a second embodiment of the invention. This embodiment is similar to the embodiment of FIGS. 1a-c, except that here package body 302 has a package housing 304 from which a protruding knob 306 extends. Here the package passage is a channel 308 formed in the side of knob 306. Package body 302 can mate with attachment member 104 as suggested by the exploded views of FIGS. 3b-c. In particular, thread 119 of attachment member 104 as shown on FIG. 2b can engage sufficiently well with protruding knob 306 to provide a secure mechanical connection.

In the preceding examples, attachment member 104 and package body 102 are separate parts that can be connected together during assembly to affix the combined assembly to valve stem 106. It is also possible in practicing the invention for the attachment member to be integral with the package body, e.g., as shown in the examples of FIGS. 4a-c.

Figure 4A:
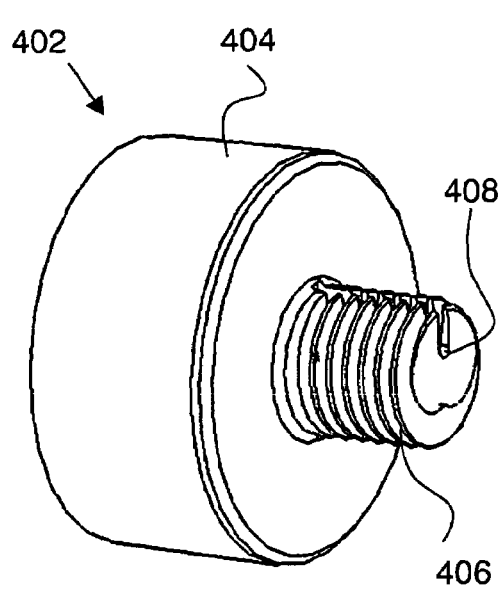
FIGS. 4a-c show sub-assemblies suitable for use with various embodiments of the invention.

FIG. 4a shows a package body 402 having a housing 404 integrated with a threaded attachment member 406 having a package passage 408. FIG. 4b shows a package body 412 having a housing 404 integrated with a barbed attachment member 416 having a package passage 418. FIG. 4c shows a package body 422 having a housing 404 integrated with a threaded attachment member 406. The example of FIG. 4c shows a package passage in the form of a bore passing through the package from 428 to 429, as opposed to the channel-like package passage of previous examples.

Figure 4B:
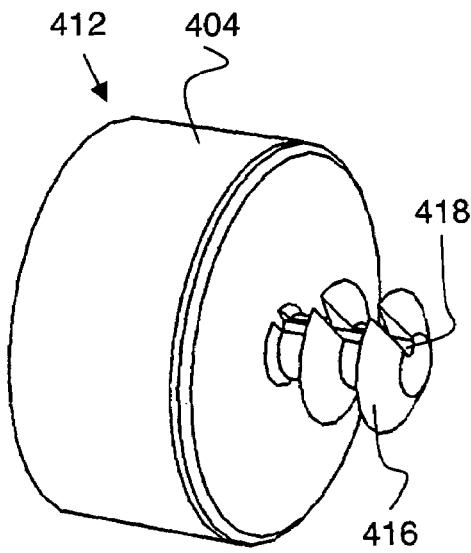
Figure 4C:
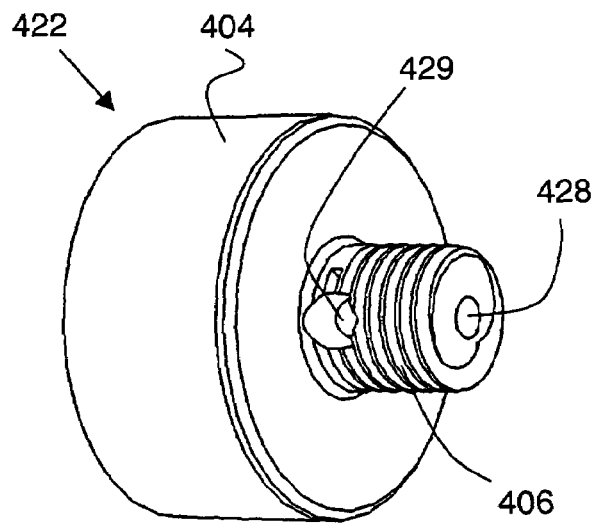
Figure 5A:
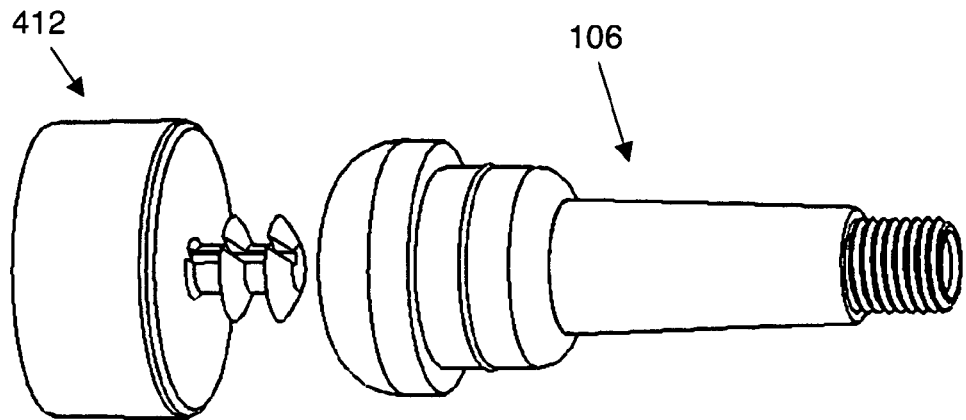
FIGS. 5a-b show two views of the sub-assembly of FIG. 4b in combination with a snap-in tire valve stem.
Figure 5B:
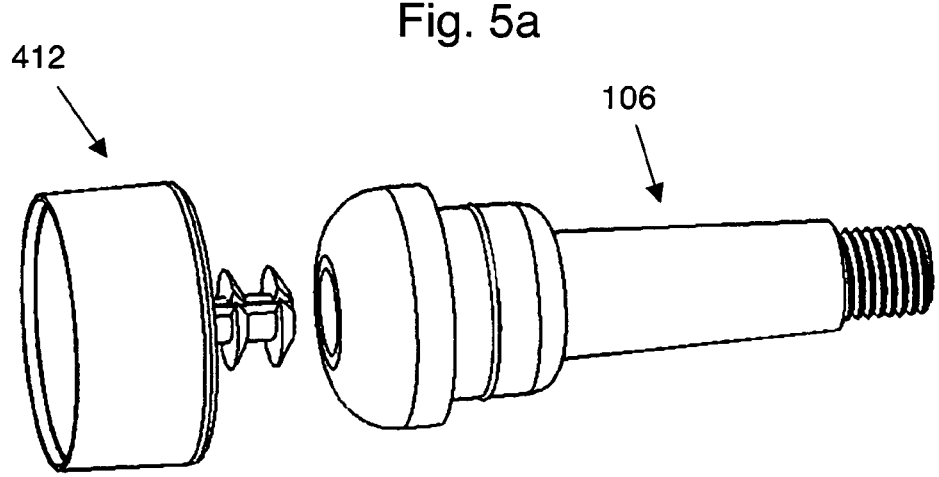

FIGS. 5a-b show two views of the package body of FIG. 4b in combination with a snap-in tire valve stem. In these views, package body 412 and valve stem 106 are positioned as they would be just prior to insertion of package body 412 into valve stem 106.

Figure 6A:
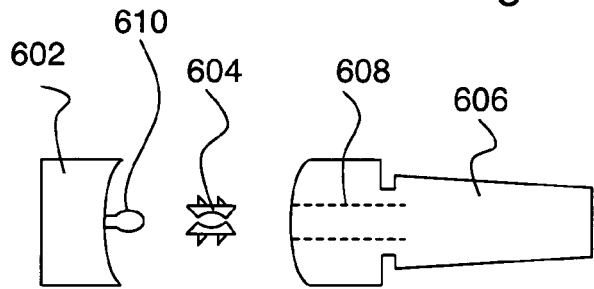
FIGS. 6a-b show two views of a third embodiment of the invention.
Figure 6B:
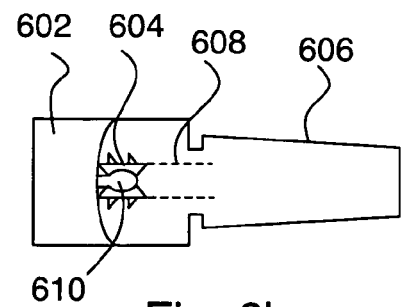

FIGS. 6a-b show two views of a third embodiment of the invention. In this embodiment, package housing 602 has a protruding knob 610 that can engage a corresponding recess in attachment member 604. Attachment member 604 can be disposed in a flexible bore 608 of valve stem 606. After this positioning of attachment member 604, knob 610 can be inserted into attachment member 604, thereby causing attachment member 604 to function as an expansion device for more securely engaging barbs on attachment member 604 with flexible bore 608. The view of FIG. 6a shows the separate parts, while the view of FIG. 6b shows the assembled configuration. In this embodiment, it is preferred for package housing 602 to conform to the shape of valve stem 606, as shown.

Figure 7:
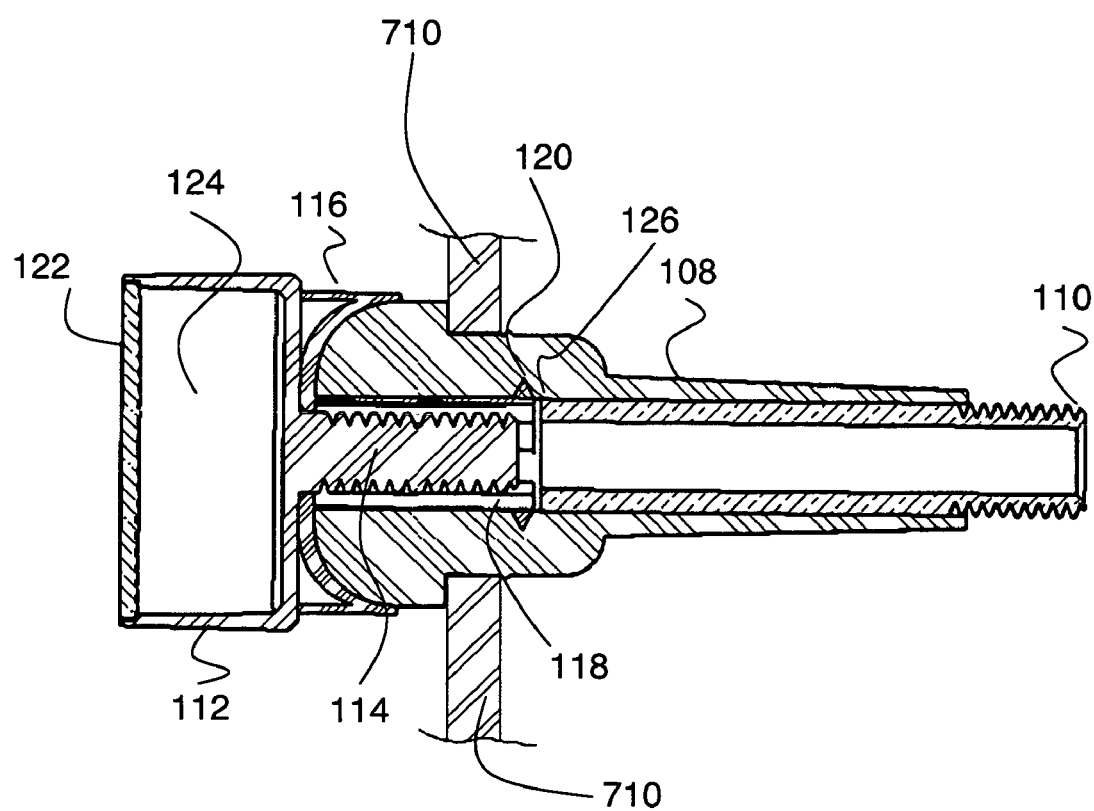
FIG. 7 shows a fourth embodiment of the invention.

FIG. 7 shows a cross section of a fourth embodiment of the invention. In this embodiment, the location of the barbs 120 is on the opposite side of wheel rim 710 from the housing 112, which can be achieved by elongating the threaded member 114 and the expansion nut 118. This feature further ensures a good seal at high force levels due to tire rotation, because wheel rim 710 tends to trap barbs 120 at the location shown on FIG. 7. This feature can also be used with any of the other embodiments described above.

A sensor package according to an embodiment of the invention can be installed in a tire valve stem before or after the tire valve stem is installed in a valve opening of a wheel rim.

The invention claimed is:

1. A package for a tire sensor, the package comprising:
   a package body configured for packaging a tire sensor;
   an attachment member connected to said package body and configured for attaching said package securely to a snap-in tire valve stem by disposing said attachment member in a flexible bore of said snap-in tire valve stem;
   wherein said attachment member is configured to engage securely with an inner wall of said flexible bore of said snap-in tire valve stem;

wherein said snap-in tire valve stem comprises a flexible body through which said flexible bore passes and a valve assembly in communication with said flexible bore;

wherein said attachment member has a package passage capable of being in communication with said flexible bore and with an interior of a tire, whereby air can pass through said package passage and said flexible bore to inflate or deflate said tire.

2. The package of claim 1, wherein said sensor comprises a tire pressure sensor.

3. The package of claim 1, wherein said attachment member is an integral part of said package body.

4. The package of claim 1, wherein a threaded member of said package body can engage one or more corresponding threads in an aperture of said attachment member, whereby said attachment member can function as an expansion nut for more securely engaging said attachment member with said inner wall of said flexible bore of said snap-in tire valve stem.

5. The package of claim 1, wherein a protruding knob of said package body can engage with said attachment member, whereby said attachment member can function as an expansion device for more securely engaging said attachment member with said inner wall of said flexible bore of said snap-in tire valve stem.

6. The package of claim 1, wherein said package passage comprises a bore through said package or a channel formed in a side of said package.

7. The package of claim 1, wherein said attachment member comprises one or more barbs disposed to engage with said inner wall of said flexible bore of said snap-in tire valve stem.

8. A sensor and valve assembly for a tire, the assembly comprising:

a snap-in tire valve stem comprising a valve assembly disposed within a flexible body, wherein said flexible body has a flexible bore within it and in communication with said valve assembly;

a tire sensor package comprising a package body configured for packaging a tire sensor and an attachment member connected to said package body and configured for attaching said package securely to said snap-in tire valve stem by disposing said attachment member in said flexible bore of said snap-in tire valve stem;

wherein said attachment member is configured to securely engage with an inner wall of said flexible bore of said snap-in tire valve stem;

wherein said attachment member has a package passage capable of being in communication with said flexible bore and with an interior of a tire, whereby air can pass through said package passage and said flexible bore to inflate or deflate said tire.

9. The assembly of claim 8, wherein said sensor comprises a tire pressure sensor.

10. The assembly of claim 8, wherein said snap-in tire valve stem consists of said valve assembly and said flexible body, whereby said snap-in tire valve stem is a standard snap-in tire valve stem.

11. The assembly of claim 8, wherein said attachment member is an integral part of said package body.

12. The assembly of claim 8, wherein a threaded member of said package body can engage one or more corresponding threads in an aperture of said attachment member, whereby said attachment member can function as an expansion nut for more securely engaging said attachment member with said inner wall of said flexible bore of said snap-in tire valve stem.

13. The assembly of claim 8, wherein a protruding knob of said package body can engage with said attachment member, whereby said attachment member can function as an expansion device for more securely engaging said attachment member with said inner wall of said flexible bore of said snap-in tire valve stem.

14. The assembly of claim 8, wherein said package passage comprises a bore through said package or a channel formed in a side of said package.

15. The assembly of claim 8, wherein said attachment member comprises one or more barbs disposed to engage with said inner wall of said flexible bore of said snap-in tire valve stem.

16. The assembly of claim 15, wherein said one or more barbs and said tire sensor package are disposed on opposite sides of a wheel rim when said assembly is installed in a valve opening of said wheel rim.

17. A method of affixing a tire sensor to a wheel, the method comprising:

providing a snap-in tire valve stem comprising a valve assembly disposed within a flexible body, wherein said flexible body has a flexible bore within it and in communication with said valve assembly;

disposing said snap-in tire valve stem in a valve stem aperture of a wheel on which a tire can be mounted;

providing a tire sensor package comprising a package body configured for packaging a tire sensor and an attachment member connected to said package body and configured for attaching said package securely to said snap-in tire valve stem by disposing said attachment member in said flexible bore of said snap-in tire valve stem;

disposing said attachment member of said tire sensor package in said flexible bore of said snap-in tire valve stem;

wherein said attachment member has a package passage capable of being in communication with said flexible bore and with an interior of a tire, whereby air can pass through said package passage and said flexible bore to inflate or deflate said tire.

18. The method of claim 17, wherein said sensor comprises a tire pressure sensor.

19. The method of claim 17, wherein said snap-in tire valve stem consists of said valve assembly and said flexible body, whereby said snap-in tire valve stem is a standard snap-in tire valve stem.

20. The method of claim 17, wherein said disposing said attachment member of said tire sensor in said flexible bore is performed before said disposing said snap-in tire valve stem in said valve stem aperture.

21. The method of claim 17, wherein said disposing said attachment member of said tire sensor in said flexible bore is performed after said disposing said snap-in tire valve stem in said valve stem aperture.

* * * * *